(12) United States Patent
Ohashi et al.

(10) Patent No.: US 9,671,550 B2
(45) Date of Patent: Jun. 6, 2017

(54) SURFACE LIGHT SOURCE DEVICE AND DISPLAY APPARATUS USING SAME

(71) Applicant: Enplas Corporation, Saitama (JP)

(72) Inventors: Yusuke Ohashi, Saitama (JP); Masao Yamaguchi, Saitama (JP)

(73) Assignee: Enplas Corporation, Saitama (JP)

( * ) Notice: Subject to any disclaimer, the term of this patent is extended or adjusted under 35 U.S.C. 154(b) by 38 days.

(21) Appl. No.: 14/604,970

(22) Filed: Jan. 26, 2015

(65) Prior Publication Data

US 2015/0212264 A1 Jul. 30, 2015

(30) Foreign Application Priority Data

Jan. 27, 2014 (JP) .................................. 2014-012473

(51) Int. Cl.
| | |
|---|---|
| F21V 7/04 | (2006.01) |
| F21V 11/00 | (2015.01) |
| G02B 5/02 | (2006.01) |
| H01J 5/16 | (2006.01) |
| H01P 5/00 | (2006.01) |
| F21V 8/00 | (2006.01) |

(52) U.S. Cl.
CPC ........... G02B 6/0096 (2013.01); G02B 6/001 (2013.01); *G02B 6/0078* (2013.01)

(58) Field of Classification Search
CPC ..... G02B 6/0096; G02B 6/001; G02B 6/0078
USPC ....................................................... 362/558
See application file for complete search history.

(56) References Cited

U.S. PATENT DOCUMENTS

| | | | | | |
|---|---|---|---|---|---|
| 6,139,174 | A | * | 10/2000 | Butterworth | H04N 1/02815 362/231 |
| 7,478,941 | B2 | * | 1/2009 | Wu | F21K 9/52 362/223 |
| 2001/0038539 | A1 | * | 11/2001 | Lea | G02B 6/001 362/551 |
| 2007/0258267 | A1 | * | 11/2007 | Huang | G02B 6/001 362/616 |
| 2008/0130314 | A1 | * | 6/2008 | Liu | G02B 6/001 362/616 |
| 2008/0186734 | A1 | * | 8/2008 | Huang | G09G 3/3426 362/612 |

(Continued)

FOREIGN PATENT DOCUMENTS

JP        2012-069499 A     4/2012

*Primary Examiner* — Peggy Neils
*Assistant Examiner* — William N Harris
(74) *Attorney, Agent, or Firm* — Brundidge & Stanger, P.C.

(57) ABSTRACT

A surface light source device includes a light source, a plurality of light guide rods that are disposed in parallel and allow light emitted from the light source to enter through an end surface and emits the incident light through an outer peripheral surface, and a diffusion plate that transmits light emitted from the light guide rod while diffusing the light. The light guide rod includes a light control part disposed on a surface along an axis of the light guide rod, and scattering, reflecting, or emitting light guided inside the light guide rod. Further, when an angle of a direction of a perpendicular relative to an extending direction of the diffusion plate from the center of the light guide rod is set as 0°, an angle of light having peak intensity to be emitted from the light guide rod is 30° to 90°.

3 Claims, 11 Drawing Sheets

(56) References Cited

U.S. PATENT DOCUMENTS

| | | | |
|---|---|---|---|
| 2009/0279305 A1* | 11/2009 | Lee | G02B 5/045 |
| | | | 362/296.01 |
| 2012/0033432 A1* | 2/2012 | Hioki | G02B 6/001 |
| | | | 362/296.09 |
| 2012/0069548 A1 | 3/2012 | Chen et al. | |
| 2014/0307198 A1* | 10/2014 | Park | G02B 6/0001 |
| | | | 349/58 |

* cited by examiner

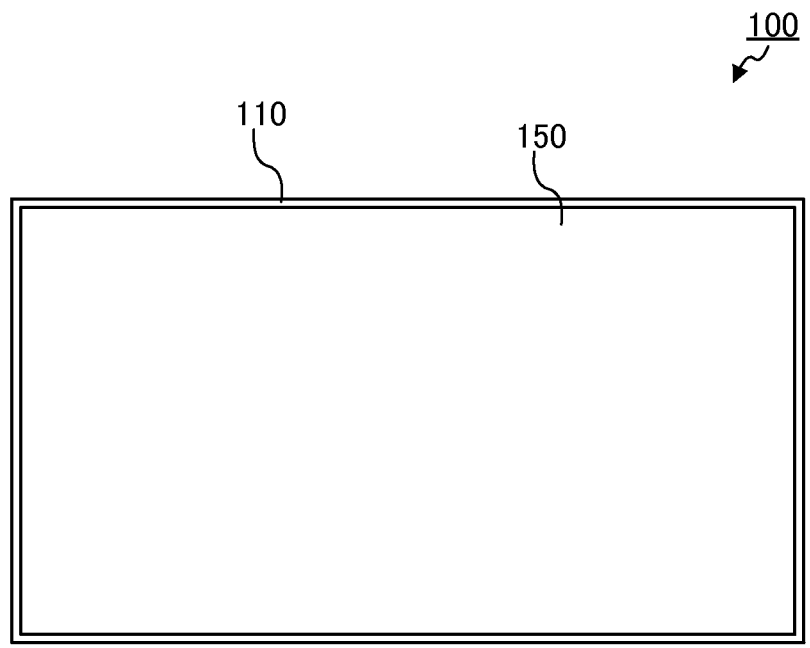
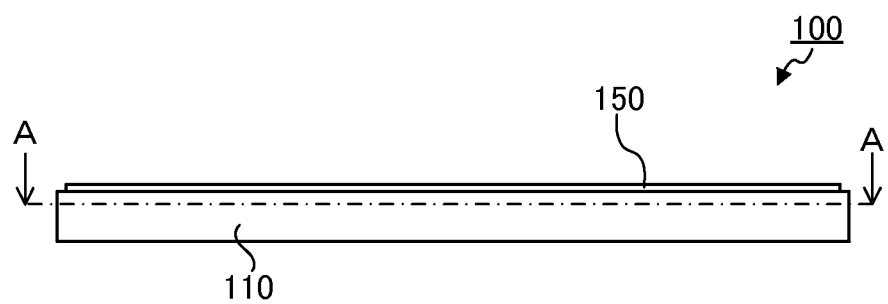

SURFACE LIGHT SOURCE DEVICE AND DISPLAY APPARATUS USING SAME

CROSS REFERENCE TO RELATED APPLICATIONS

This application is entitled to and claims the benefit of Japanese Patent Application No. 2014-012473, filed on Jan. 27, 2014, the disclosure of which including the specification, drawings and abstract is incorporated herein by reference in its entirety.

TECHNICAL FIELD

The present invention relates to a surface light source device and a display apparatus using the same.

BACKGROUND ART

As a light source of a surface light source device of an edge-lit type with a hollow structure, there has been known a light source using a light-emitting diode (hereinafter, referred to as "LED"). In such a surface light source device, there is a case where a combination of an LED and a columnar or tubular light guide member may be used in order to control the distribution of light emitted from the LED (see, for example, PTL 1).

PTL 1 discloses a back light (surface light source device) having a reflection plate disposed on the bottom surface, a plurality of rod-like light sources disposed over the reflection plate, and a polarizing plate disposed over the plurality of rod-like light sources. The rod-like light source has a pipe body having a plurality of light collecting points over its outer peripheral surface, and light sources disposed on both ends of the pipe body.

In the back light set forth in PTL 1, light emitted from the light source moves forth inside the pipe body, and then is released from the light collecting part. Light released from the light collecting part toward the bottom surface is reflected by the reflection plate in the direction of the polarizing plate. On the other hand, light released from the light collecting part toward the top surface directly reaches the polarizing plate.

CITATION LIST

Patent Literature

PTL 1
Japanese Patent Application Laid-Open No. 2012-069499

SUMMARY OF INVENTION

Technical Problem

In the back light set forth in PTL 1, the light collecting part is disposed over the entire outer peripheral surface of the pipe body, and light is emitted uniformly from the entire outer peripheral surface of each pipe body. As a result, the light emitting surface (surface of the polarizing plate) is likely to have a relatively higher luminance directly above pipe bodies, and is likely to have a relatively lower luminance between the pipe bodies. In order to solve this problem, in the back light set forth in PTL 1, the rod-like light sources are disposed without clearance therebetween over the reflection plate, and the rod-like light sources and the polarizing plate are spaced away from each other sufficiently. However, when the rod-like light sources are disposed without clearance therebetween, a large number of rod-like light sources are required, causing the production costs to be increased. Further, when the rod-like light sources and the polarizing plate are spaced away from each other sufficiently, the size of the apparatus results in being increased.

An object of the present invention is to provide a surface light source device capable of improving the uniformity ratio of the luminance of a light emitting surface despite decreased numbers of light sources and light guide rods while making the size of the apparatus smaller. Further, another object of the present invention is to provide a display apparatus that includes the surface light source device.

Solution to Problem

In order to achieve the aforementioned objects, the surface light source device according to the present invention includes a light source, a light guide rod that allows light emitted from the light source to enter through an end surface of the light guide rod and emits the incident light through an outer peripheral surface of the light guide rod, and a diffusion plate that transmits light emitted from the light guide rod while diffusing the light, wherein the light guide rod includes a light control part that is disposed on a surface along an axis of the light guide rod, and carries out at least one of inwardly reflecting a part of light guided inside the light guide rod while scattering the part of light, and outwardly emitting a part of light guided inside the light guide rod while scattering the part of light, and wherein, in a cross section orthogonal to the axis of the light guide rod, an angle of light having peak intensity to be emitted from the light guide rod is 30° to 90° when the angle of a direction of a perpendicular relative to an extending direction of the diffusion plate from a center of the light guide rod is set as 0°.

Further, the display apparatus according to the present invention has the aforementioned surface light source device, and a display member to be irradiated with light emitted from the diffusion plate of the surface light source device.

Advantageous Effects of Invention

The surface light source device according to the present invention is capable of improving the uniformity ratio of the luminance of a light emitting surface despite decreased numbers of light emitting elements and light guide rods while making the size of the apparatus smaller. Therefore, the display apparatus according to the present invention has less luminance unevenness than that of a conventional display apparatus.

BRIEF DESCRIPTION OF DRAWINGS

FIGS. 1A and 1B are drawings illustrating the configuration of a surface light source device according to one embodiment of the present invention;

DESCRIPTION OF EMBODIMENTS

In the following, an embodiment of the surface light source device according to the present invention will be described in detail with reference to the accompanying drawings. When used with a display member such as a liquid crystal panel, the surface light source device according to the present invention can be used as a display apparatus.

[Configurations of Surface Light Source Device]

Figure 2A:
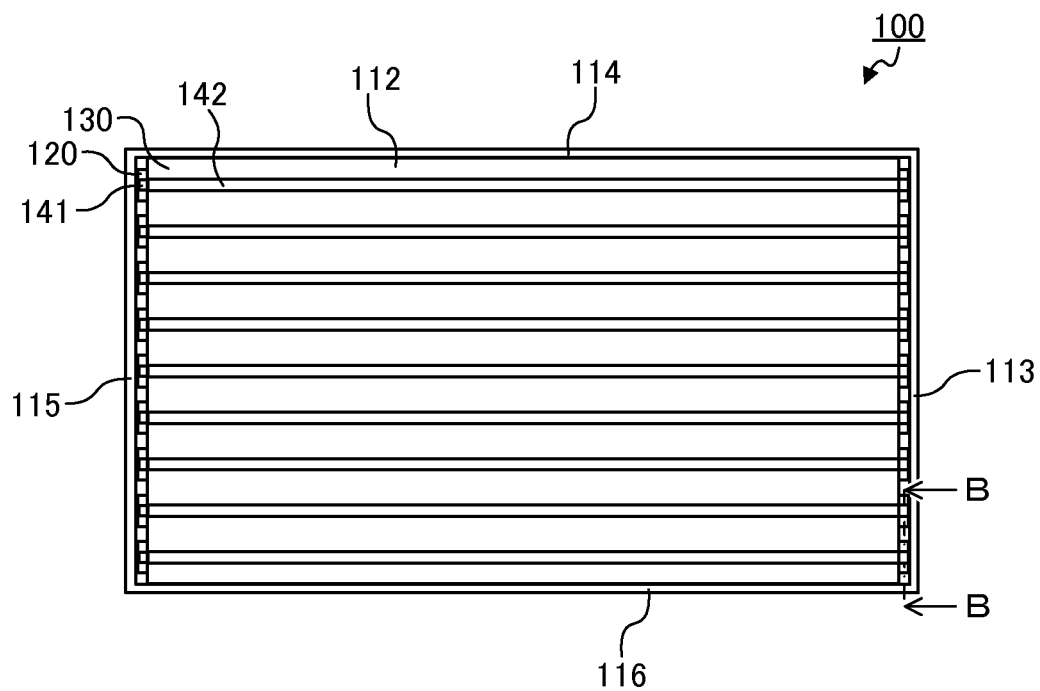
FIGS. 2A and 2B are drawings illustrating the configuration of a surface light source device according to one embodiment of the present invention.
Figure 2B:
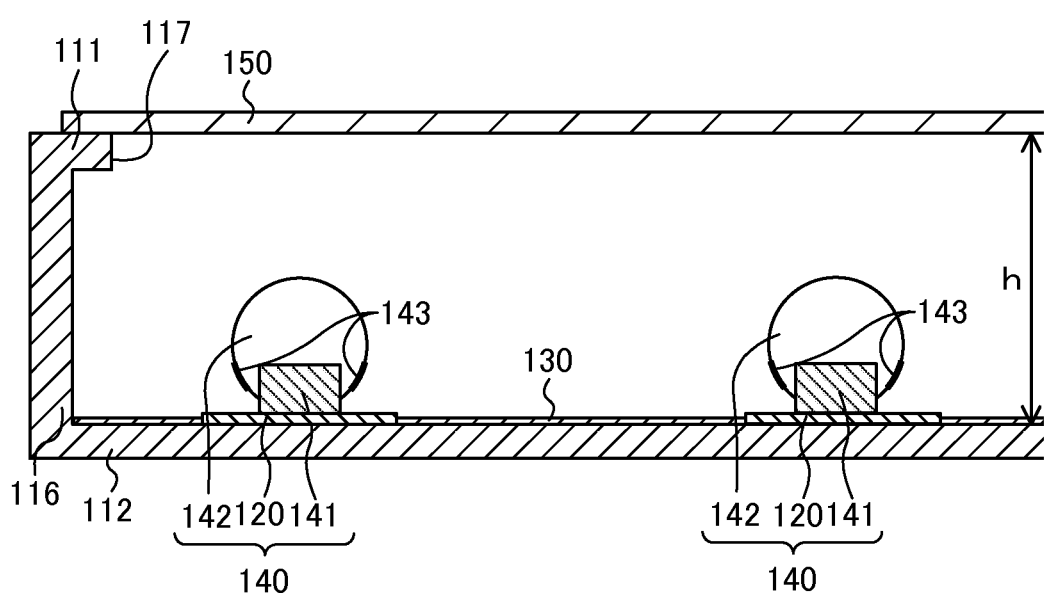
Figure 3:
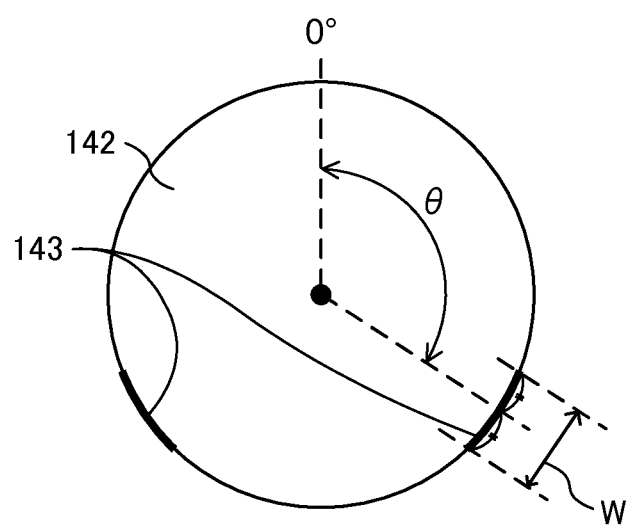
FIG. 3 is an explanatory drawing of an angle in the circumferential direction.
Figure 4A:
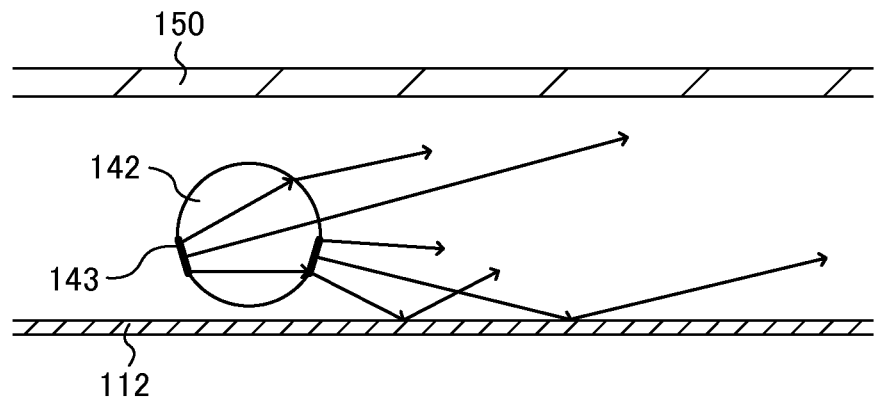
FIGS. 4A and 4B are drawings of optical paths in the surface light source device.
Figure 4B:
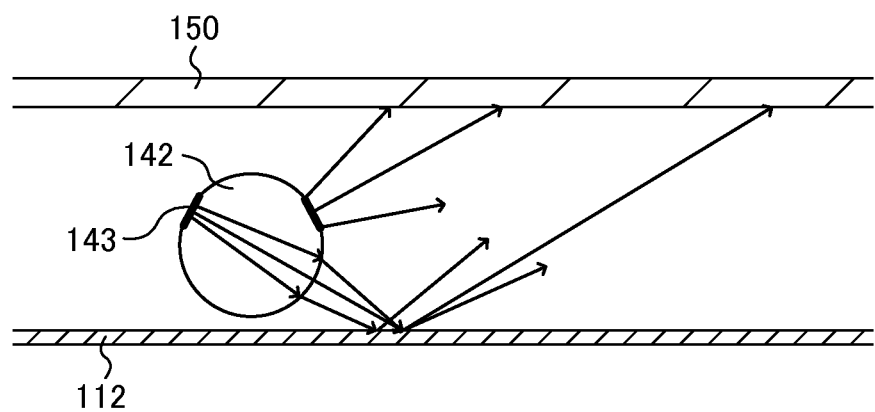

FIGS. 1A and 1B and 2A and 2B are drawings illustrating the configuration of surface light source device 100 according to one embodiment of the present invention. FIG. 1A is a plan view of surface light source device 100, and FIG. 1B is a front view of surface light source device 100. FIG. 2A is a sectional view taken along line A-A illustrated in FIG. 1B, and FIG. 2B is a sectional view taken along line B-B illustrated in FIG. 2A. FIG. 3 is an explanatory drawing of an angle θ in the circumferential direction. FIGS. 4A and 4B are drawings of optical paths in the surface light source device.

As illustrated in FIGS. 1A and 1B and 2A and 2B, surface light source device 100 has casing 110, reflection member 130, a plurality of light emitting devices 140 and diffusion plate 150.

Casing 110 is a cuboid-shaped box, at least a part of one surface of which is opened, for casing therein reflection member 130 and a plurality of light emitting devices 140. Casing 110 is composed of top plate 111, bottom plate 112 facing top plate 111, and four side plates 113 to 116 that link top plate 111 and bottom plate 112. At top plate 111, there is formed rectangle-shaped opening 117 that functions as a light emitting area (see FIG. 2B). Opening 117 is covered with diffusion plate 150. The size of opening 117 corresponds to the size of the light emitting area (light emitting surface) formed at diffusion plate 150, and for example is 400 mm×700 mm. Bottom plate 112 and diffusion plate 150 are disposed in parallel. While the height (spatial thickness) h from the surface of bottom plate 112 to diffusion plate 150 is not particularly limited, the height h is about 10 mm to 25 mm. It is noted that, in the present embodiment, spatial thickness h is 15 mm. Further, casing 110 is composed, for example, of resin such as polymethylmethacrylate (PMMA) and polycarbonate (PC), or metal such as stainless steel and aluminum.

Light emitting device 140 has substrate 120, light emitting element 141 and light guide rod 142 (see FIG. 2B). A plurality of light emitting devices 140 are disposed such that the optical axis of light to be emitted from each of light emitting devices 140 is parallel to the surface of bottom plate 112.

Substrate 120 is a rectangular flat plate, and is disposed inside casing 110 in such a state that light emitting element 141 and light guide rod 142 are mounted thereon. The number of substrate 120 is not particularly limited. In the present embodiment, a plurality of substrates 120 are disposed, and one light emitting element 141 and one light guide rod 142 are disposed on each substrate 120. The direction in which substrate 120 is disposed is not particularly limited. Substrates 120 either may be disposed at a given interval along two side plates 113 and 115 facing each other, or may be disposed at a given interval along two side plates 114 and 116 facing each other. In the present embodiment, a plurality of substrates 120, i.e., nine substrates 120 are disposed at an equal interval on bottom plate 112 along each of side plates 113 and 115.

Light emitting element 141 is a light source of surface light source device 100 (and light emitting device 140). Light emitting element 141 fixed (mounted) on substrate 120 is disposed such that its light emitting surface faces the end surface of light guide rod 142. Light emitting device 140 either may have one light emitting element 141, or may have two light emitting elements 141. In the former case, light emitting element 141 is disposed at only one end surface of light guide rod 142. In the latter case, two light emitting elements 141 are disposed so as to face each other at the end surfaces of light guide rod 142. In the present embodiment, two light emitting elements 141 are disposed at both ends of light guide rods 142. Light emitting element 141 is a light-emitting diode (LED) such as a white light-emitting diode, for example.

Light guide rod 142 is a light guide member that guides light emitted from light emitting element 141 and emits light having been guided toward the outside. Light guide rod 142 is disposed such that its central axis is parallel to the optical axis of light to be emitted from light emitting element 141 and such that light guide rode 142 does not contact reflection member 130. That is, an air layer is disposed between light guide rod 142 and reflection member 130. The sectional shape of light guide rod 142 in a direction orthogonal to the central axis of light guide rod 142 is not particularly limited. In the present embodiment, the sectional shape of light guide rod 142 in the direction orthogonal to the central axis of light guide rod 142 is circular or substantially circular. Further, the diameter of such a circle is not particularly limited, either, and is about 3 mm to 20 mm. In the present embodiment, the diameter of the circle is 8 mm. Further, the length of light guide rod 142 is not particularly limited, either, and can be set appropriately depending on the size of the light emitting surface. In the present embodiment, the length of light guide rod 142 is 69 cm. The material for light guide rod 142 is not particularly limited as long as the material is a light-transmissive material capable of guiding light emitted from light emitting element 141. Examples of the material for light guide rod 142 include acryl resin.

In surface light source device 100 according to the present embodiment, uniform luminance is realized on the outer surface (light emitting surface) of diffusion plate 150 by adjusting the amount of emission light from the outer peripheral surface of light guide rod 142 according to the circumferential direction of light guide rod 142. FIG. 3 is an explanatory drawing of angle θ in the circumferential direction. As illustrated in FIG. 3, when the angle of the direction of a perpendicular relative to the extending direction of diffusion plate 150 from the center of light guide rod 142 is set as 0° in the cross section orthogonal to the central axis (axis) of light guide rod 142, light guide rod 142 of surface light source 100 according to the present invention has the peak of the intensity of light to be emitted in the direction in which angle θ in the circumferential direction is 50° or more. In the following description, unless described specifically, the description of angle is to mean "angle θ in the circumferential direction." When the angle of light having peak intensity (luminous intensity) is less than 30°, a bright part occurs in a part of the light emitting surface directly above light guide rod 142. In order to set the angle of light having peak intensity to be 30° or more, it is necessary to dispose light control part 143 at a given position.

Light control part 143 carries out at least either one of inwardly reflecting a part of light having been guided inside light guide rod 142 while scattering the part of light, or outwardly emitting a part of light while scattering the part of light. Light control part 143 is disposed in a belt-like manner on a part of the outer peripheral surface of light guide rod 142 along the central axis. The outer peripheral surface of light guide rod 142 where light control part 143 is not disposed is a smooth curved surface. The shape of light control part 143 is not particularly limited. The shape of light control part 143 may either be a curved surface or a planar surface. In the present embodiment, the shape of light control part 143 is a curved surface. When light control part 143 has a curved surface, such a paint as to exert the aforementioned functions may be applied to a relevant portion to form light control part 143, or alternatively the above-mentioned portion may be roughened to form light control part 143. On the other hand, when light control part 143 has a planar surface, the above-mentioned portion may be shaved to form light control part 143. Further, in the same manner as the case when light control part 143 has a curved surface, a paint may be applied, or alternatively the surface may be roughened.

Light control part 143 either may be formed in the same width from one end to the other end in the central axis direction of light guide rod 142 on the outer peripheral surface, or may be formed in different widths. Both in the case where the width of light control part 143 is constant, and in the case where the width of light control part 143 varies, the minimum width of light control part 143 is preferably about 5% to 50% of the diameter of light guide rod 142. In the present embodiment, light control part 143 is formed in the same width from one end to the other end. The width of light control part 143 is not particularly limited. In the present embodiment, the width of light control part 143 is about 0.5 mm to 1.5 mm.

The position of light control part 143 on the surface of light guide rod 142 is preferably within a range of 75° to 120°. Here, as illustrated in FIG. 3, the phrase "the position of the light control part is at angle θ in the circumferential direction" means that the center of light control part 143 is positioned at angle θ in the circumferential direction in the cross section orthogonal to the axis of light guide rod 142. As illustrated in FIGS. 4A and 4B, it can be observed that, when light control part 143 is disposed within a given angular range, most of light to be emitted from light guide rod 142 is propagated toward positions away from a point directly above light guide rod 142. That is, most of light emitted from light guide rod 142 is emitted in such a manner as to pass between diffusion plate 150 and reflection member 130 in the cross section orthogonal to the axis of light guide rod 142, and thus a bright part does not easily occur in a part directly above light guide rod 142.

Further, the number of light control part 143 is not particularly limited. The number of light control part 143 may either be one or two. Specifically, when one light control part 143 is employed, light control part 143 either may be disposed at the position of angle θ clockwise in the circumferential direction from the point directly above light guide rod 142, or may be disposed at the position of angle θ counterclockwise in the circumferential direction from the part directly above light guide rod 142. In the present embodiment, light control parts 143 are disposed respectively at angle θ clockwise and counterclockwise in the circumferential direction from the part directly above light guide rod 142. When light guide rod 142 having one light control part 143 being formed thereon is used for surface light source device 100, it can be disposed so as to be closer to either one of the side plates, thereby improving the uniformity ratio.

Reflection member 130 is a rectangular flat plate for diffusing and reflecting light emitted from light emitting device 140 (light guide rod 142) toward diffusion plate 150. Reflection member 130 is disposed on bottom plate 112. It is noted that bottom plate 112 may have a function of reflecting light. In this case, a surface of bottom plate 112 facing light emitting device 140 (light guide rod 142) is formed as the reflection surface.

Diffusion plate 150 transmits light emitted from light guide rod 142 while diffusing the light. Diffusion plate 150 is disposed so as to cover opening 117 of casing 110. The configuration of diffusion plate 150 is not particularly limited as long as it can exert the aforementioned functions. Examples of the configuration of diffusion plate 150 include a configuration in which two types of luminance-enhancer films are disposed on a diffusion sheet, a configuration in which a diffusion sheet is further disposed on the luminance-enhancer film, and a configuration in which only a diffusion sheet is disposed.

(Effect)

As described above, in surface light source device 100 according to the present invention, when the angle of a point directly above light guide rod 142 is set as 0° in the cross section orthogonal to the axis of light guide rod 142, the angle of light having peak intensity to be emitted from light guide rod 142 is 30° or more. Therefore, most of light to be emitted from light guide rod 142 is emitted so as to pass through between reflection plate 150 and reflection member 130. Thereby, in surface light source device 100, a bright part does not occur in the part directly above light guide rod 142, and thus there is less luminance unevenness on diffusion plate 150.

Further, most of light to be emitted from light guide rod 142 is emitted so as to pass through between reflection plate 150 and reflection member 130, and thus an area between light guide rods 142 can be brighter. Therefore, it becomes possible to decrease the number of light emitting elements 141 and light guide rods 142. Further, since the interval between reflection member 130 and diffusion plate 150 can be decreased, the size of the apparatus can be made smaller.

It is noted that, while not illustrated in particular, a reflection member may be further provided in an area between two adjacent light guide rods 142 in the cross section orthogonal to the axis of light guide rod 142, which is disposed so as to be closer to diffusion plate 150, as being away from light guide rod 142. In this case, the interval between diffusion plate 150 and reflection member 130 is made narrower, as being away from light guide rod 142.

Thereby, it becomes possible to reduce luminance unevenness in surface light source device 100.

While in the embodiment described above light emitting device 140 having a plurality of substrates 120 is indicated, the number of the substrate may be one. In this case, the size of the substrate is about the same as that of bottom plate 112. Further, a plurality of light guide rods 142 are disposed on substrate 120.

While in the embodiment described above light emitting device 140 having a plurality of substrates 120 is indicated, the number of the substrate may be one. In this case, the size of the substrate is, for example, about the same as those of side plates 113 and 115 (or side plates 114 and 116). Further, a plurality of light guide rods 142 may be attached to substrate 120 on which a plurality of light emitting elements 141 are mounted, directly or via a fixing member, so that light emitting element 141, light guide rod 142 and substrate 120 are disposed inside casing 110 in such a manner as to be integrated as light emitting device 140.

Further, light guide rod 142 either may be fixed to substrate 120 or may be fixed to side plates 113 and 115 (or side plates 114 and 116) and bottom plate 112 of casing 110.

The present invention will now be described in detail with reference to Examples, which however shall not be construed as limiting the present invention.

EXAMPLES

Figure 5:
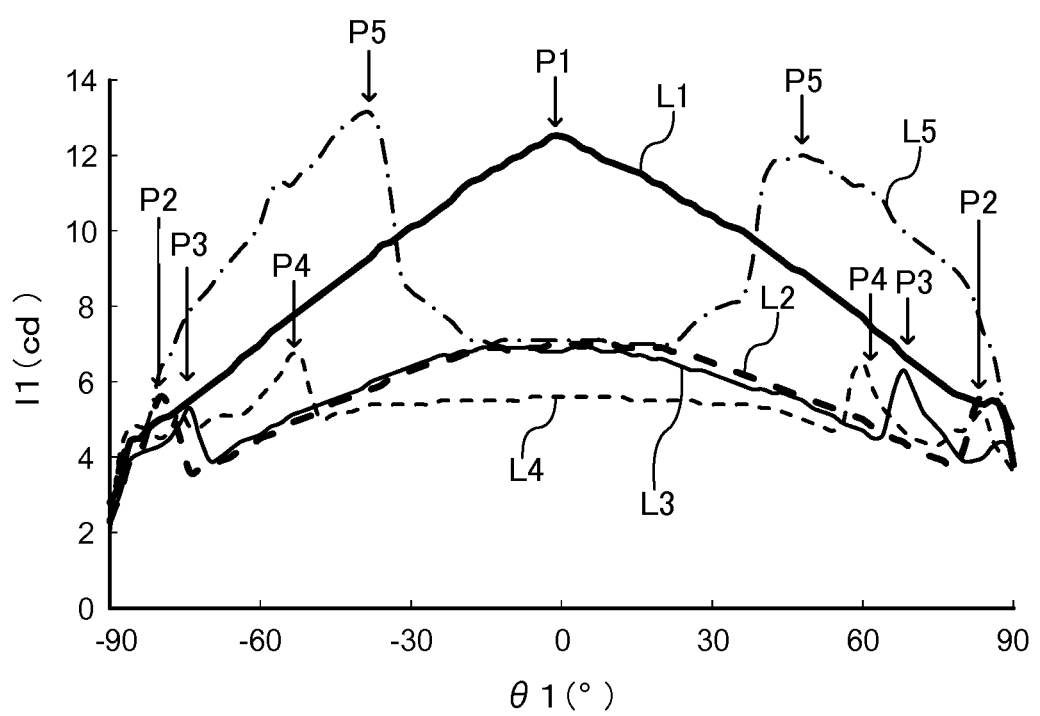
FIG. 5 is a graph illustrating the relationship between an angle in the circumferential direction and a luminous intensity.

1. Relationship between Angle θ in Circumferential Direction and Luminous Intensity of Light FIG. 5 illustrates the relationship between angle θ in the circumferential direction and the luminous intensity of light to be emitted from light guide rod 142. The abscissa in FIG. 5 indicates an angle (θ1; °) in the circumferential direction. Further, the ordinate indicates the luminous intensity (I1; cd) of light to be emitted from light guide rod 142. The parameters of the surface light source device used were set as follows: the number of light emitting device: 1, interval between reflection member 130 and light guide rod 142: 1 mm, diameter D of light guide rod 142: 8 mm, width of light control part 143: 1.5 mm, interval h between bottom plate 112 and diffusion plate 150: 15 mm, and measurement position: periphery of the central portion of light guide rod 142. Further, in the measurement, light guide rods 142 were used on which light control parts 143 are disposed at the positions of ±60°, ±75°, ±90°, ±105°, and ±120°. In FIG. 5, thick solid line L1 is a curve for light guide rod 142 on which light control parts 143 are disposed at ±160°. Thick broken line L2 is a curve for light guide rod 142 on which light control parts 143 are disposed at ±75°. Thin solid line L3 is a curve for light guide rod 142 on which light control parts 143 are disposed at ±90°. Thin broken line L4 is a curve for light guide rod 142 on which light control parts 143 are disposed at ±105°. Dashed line L5 is a curve for light guide rod 142 on which light control parts 143 are disposed at ±120°.

As illustrated in FIG. 5, in light guide rod 142 on which light control parts 143 are disposed at ±60°, the peak of the intensity of light was at ±0° (P1) and less than ±30°. On the other hand, in light guide rods 142 on which light control parts 143 are disposed at ±75°, ±90°, ±105°, and ±120°, the peaks (P2 to P5) of the intensity of light were within the range of ±30° to 90°. This is because the range between −90° and +90° is a measurable range. Assuming that the entire circumferential direction of light guide rod 142 is measurable, it can be easily deduced, from the drawings of optical paths illustrated in FIGS. 4A and 4B, that a peak occurs also for emission light toward the side of reflection member 130. Here, the "peak of the intensity of light" means a specifically strong peak compared to those in the peripheral angular areas. Accordingly, even in the case where light control part 143 indicated the maximum intensity near ±0° as in ±75° and ±90°, the intensity change was gentle and does not indicate a specific intensity; therefore, this maximum intensity is not considered to be a peak.

Figure 6A:
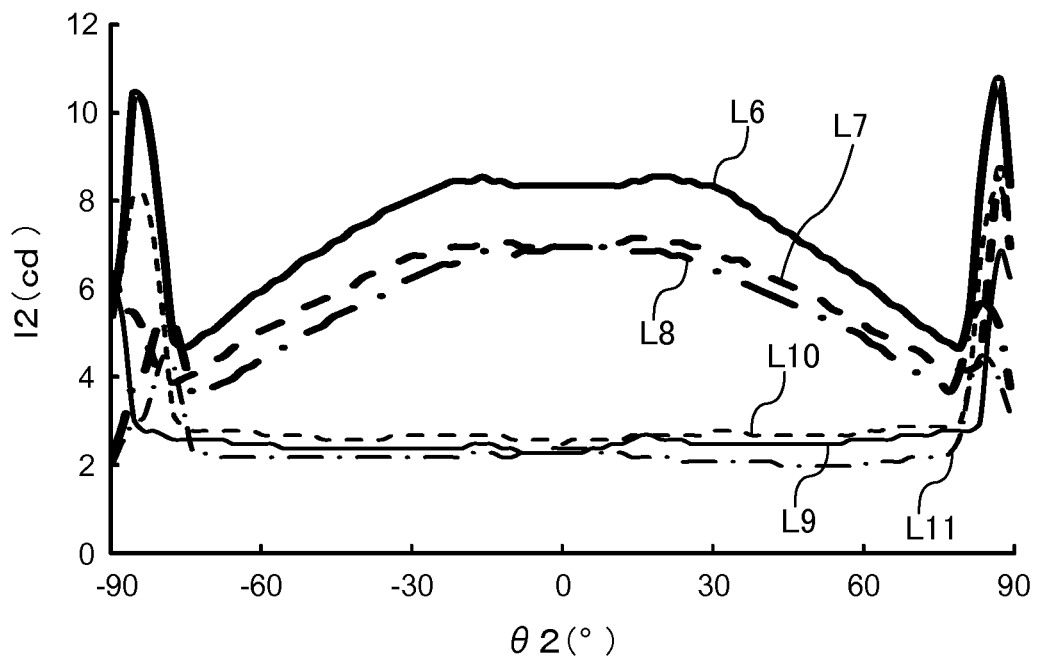
FIGS. 6A and 6B are graphs illustrating the relationship between an angle in the circumferential direction and a luminous intensity.
Figure 6B:
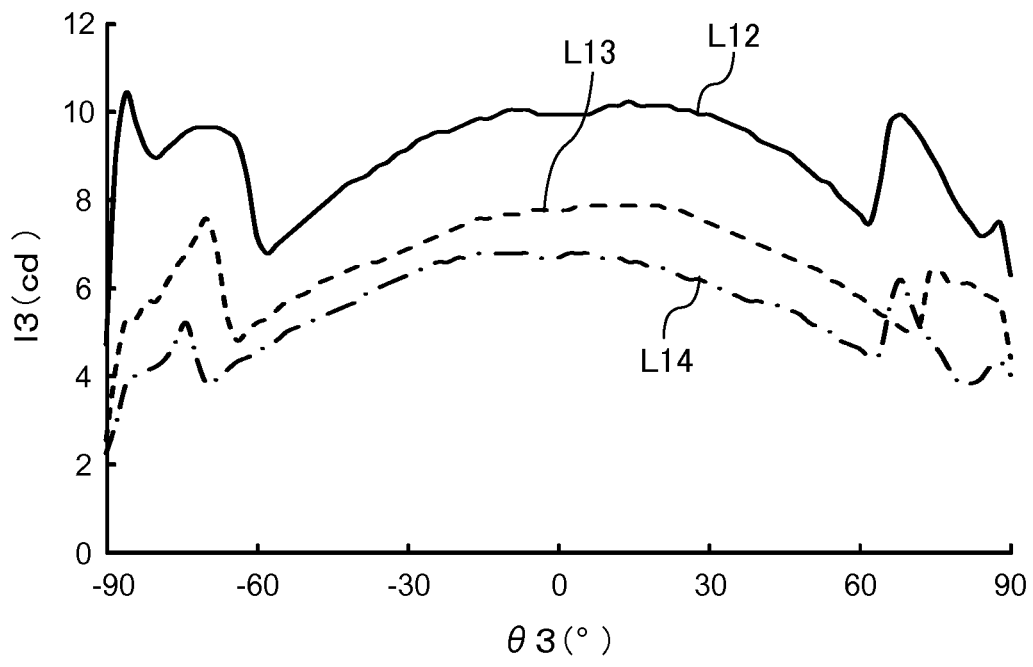
Figure 7:
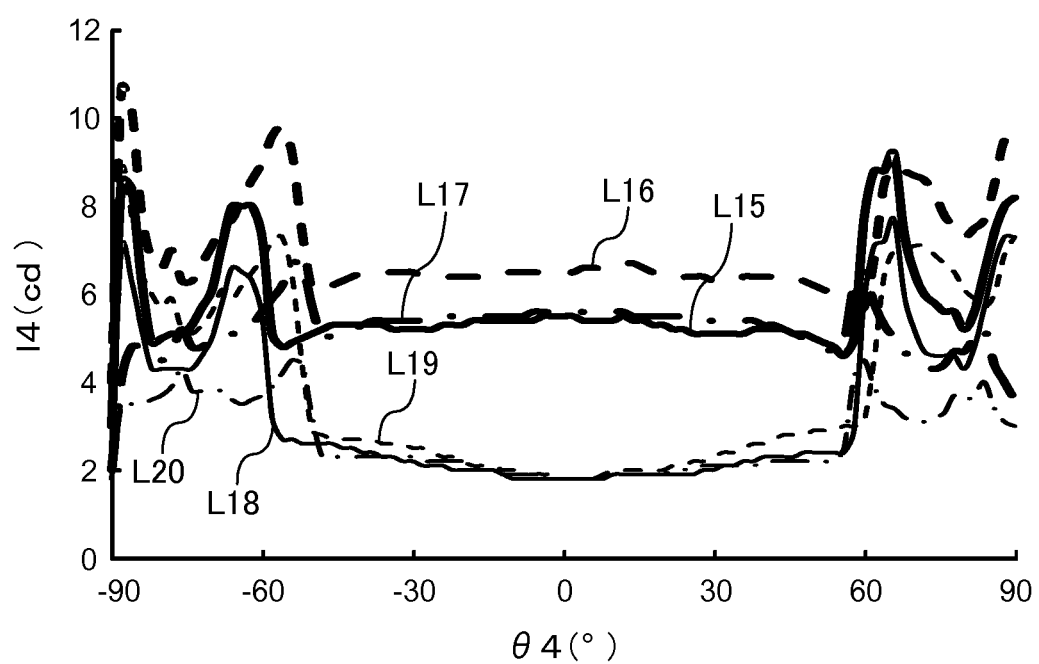
FIG. 7 is a graph illustrating the relationship between an angle in the circumferential direction and a luminous intensity.

2. Influence of Width of Light Control Part 143 on Relationship Between Angle θ in Circumferential Direction of Light to be Emitted and Luminous Intensity of Light FIGS. 6A and 6B and 7 are graphs illustrating the relationship between angle θ in the circumferential direction of light to be emitted and the luminous intensity of emitted light. FIG. 6A is a graph illustrating the relationship between angle θ in the circumferential direction of light to be emitted and the luminous intensity of emitted light in the case where light control parts 143 are disposed at ±75°. FIG. 6B is a graph illustrating the relationship between angle θ in the circumferential direction of light to be emitted and the luminous intensity of emitted light in the case where light control parts 143 are disposed at ±90°. FIG. 7 is a graph illustrating the relationship between angle θ in the circumferential direction of light to be emitted and the luminous intensity of emitted light in the case where light control parts 143 are disposed at ±105°.

The abscissas in FIGS. 6A and 6B and 7 indicate angles (θ2 to θ4; °) in the circumferential direction of light to be emitted. Further, the ordinates indicate the luminous intensities (I2 to I4; cd) of light emitted from light guide rod 142. The parameters of the surface light source device used were set as follows: the number of light emitting device 140: 1, interval between reflection member 130 and light guide rod 142: 1 mm, diameter D of the light guide rod: 8 mm, interval h between bottom plate 112 and diffusion plate 150: 15 mm, and measurement position: central portion of light guide rod 142. Further, in the measurement, there were used light guide rods 142 having light control parts 143 with widths of 0.5 mm, 1.0 mm and 1.5 mm. Further, for comparison, the similar measurement was also carried out for a surface light source device not having reflection member 130.

L6, L7 and L8 in FIG. 6A are results for surface light source device 100 according to the present invention having reflection member 130, and L9, L10 and L11 in FIG. 6A are results for the surface light source device of the comparative example not having a reflection member. Thick solid line L6 in FIG. 6A is a curve for light guide rod 142 having light control part 143 with a width of 0.5 mm. Thick broken line L7 is a curve for light guide rod 142 having light control part 143 with a width of 1.0 mm. Thick dashed line L8 is a curve for light guide rod 142 having light control part 143 with a width of 1.5 mm. Thin solid line L9 is a curve for light guide rod 142 having light control part 143 with a width of 0.5 mm. Thin broken line L10 is a curve for light guide rod 142 having light control part 143 with a width of 1.0 mm. Thin dashed line L11 is a curve for light guide rod 142 having light control part 143 with a width of 1.5 mm. It is noted that thick dashed line L8 is the same as thick broken line L2 illustrated in FIG. 5.

FIG. 6B illustrates the results for the case where only surface light source device having reflection member 130 was used. Solid line L12 in FIG. 6B is a graph for light guide rod 142 having light control part 143 with a width of 0.5 mm. Broken line L13 is a graph for light guide rod 142 having light control part 143 with a width of 1.0 mm. Dashed line L14 is a graph for light guide rod 142 having light control part 143 with a width of 1.5 mm. It is noted that broken line L13 is the same as thin solid line L3 illustrated in FIG. 5.

L15, L16 and L17 in FIG. 7 are results for a surface light source device having a reflection member, and L18, L19 and L20 in FIG. 7 are results for a surface light source device not having a reflection member. Thick solid line L15 in FIG. 7 is a curve for light guide rod 142 having light control part 143 with a width of 0.5 mm. Thick broken line L16 is a curve for light guide rod 142 having light control part 143 with a width of 1.0 mm. Thick dashed line L17 is a curve for light guide rod 142 having light control part 143 with a width of 1.5 mm. Thin solid line L18 is a curve for light guide rod 142 having light control part 143 with a width of 0.5 mm. Thin broken line L19 is a curve for light guide rod 142 having light control part 143 with a width of 1.0 mm. Thin dashed line L20 is a curve for light guide rod 142 having light control part 143 with a width of 1.5 mm.

As illustrated in FIGS. 6A and 6B and 7, the angle of light with peak luminous intensity in light guide rod 142 did not depend on width W of light control part 143.

3. Luminance Distribution of Light on Diffusion Plate 150

Figure 8A:
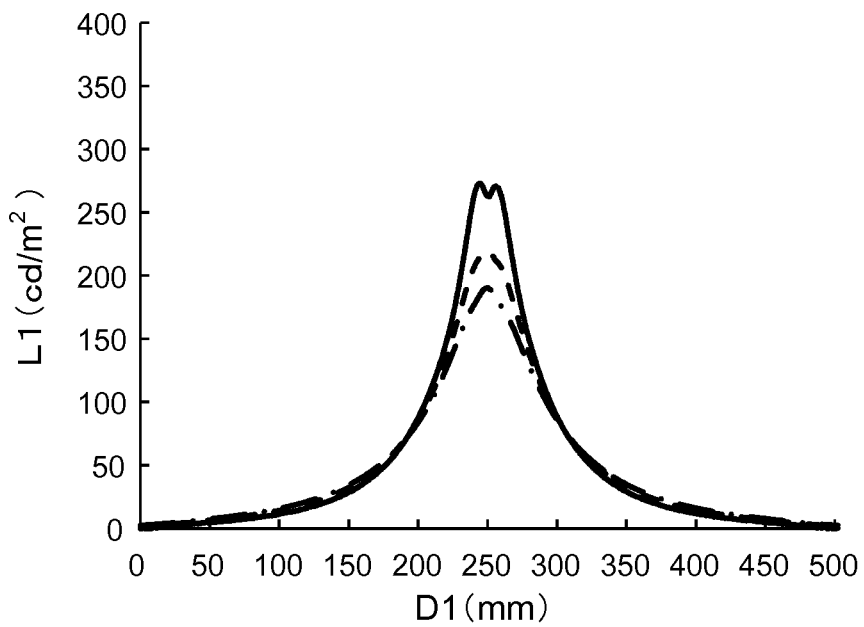
FIGS. 8A and 8B are graphs illustrating the relationship between a measurement position and a luminous intensity in the surface light source device.
Figure 8B:
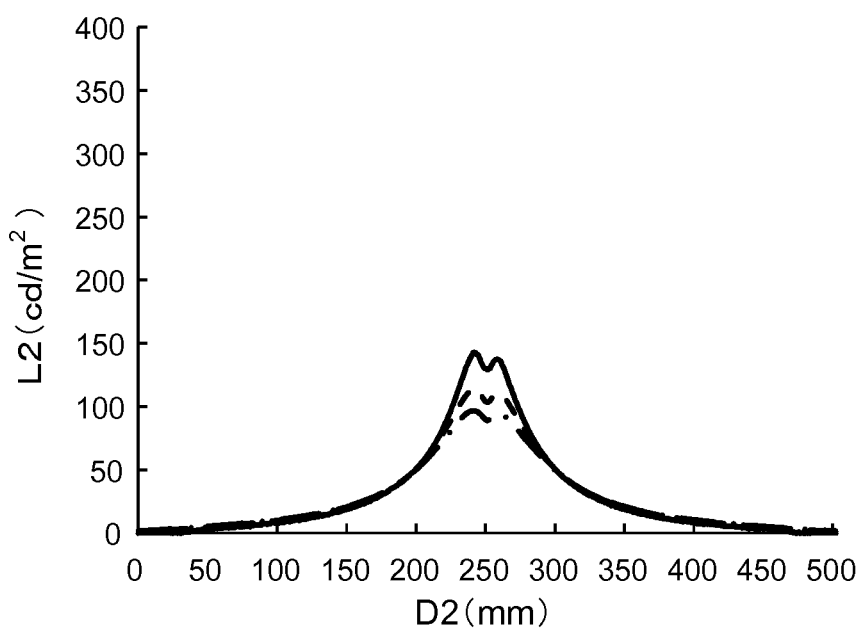
Figure 9A:
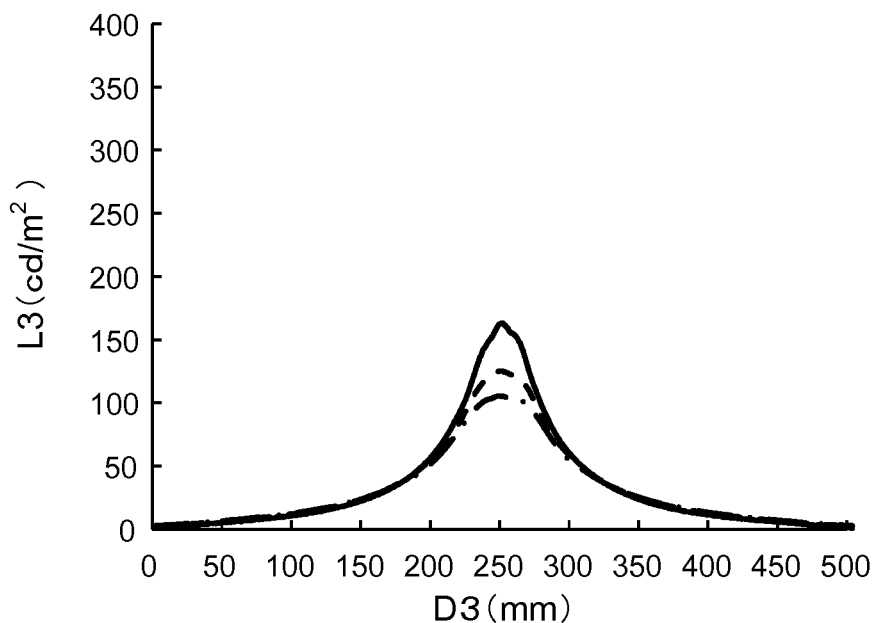
FIGS. 9A and 9B are graphs illustrating the relationship between a measurement position and a luminous intensity in the surface light source device.
Figure 9B:
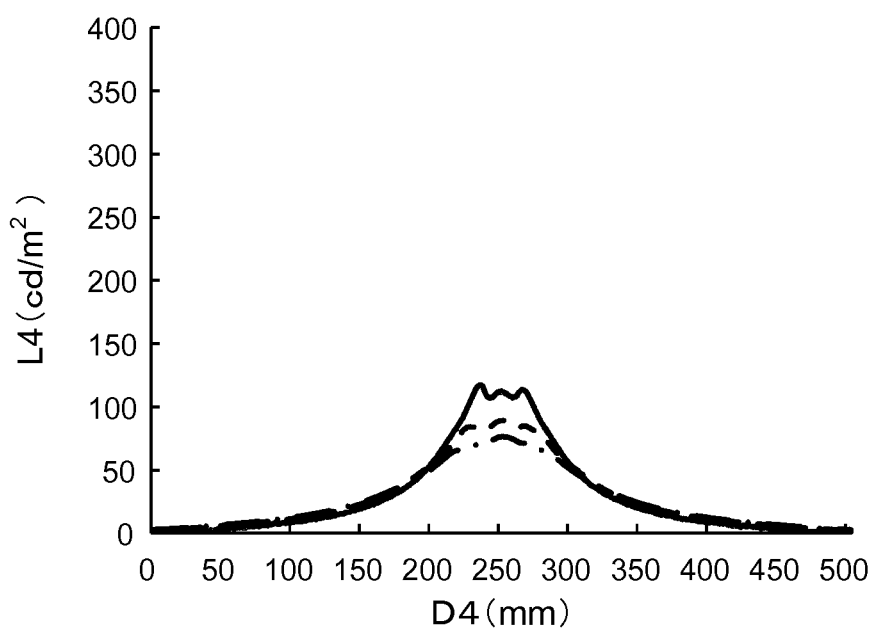
Figure 10:
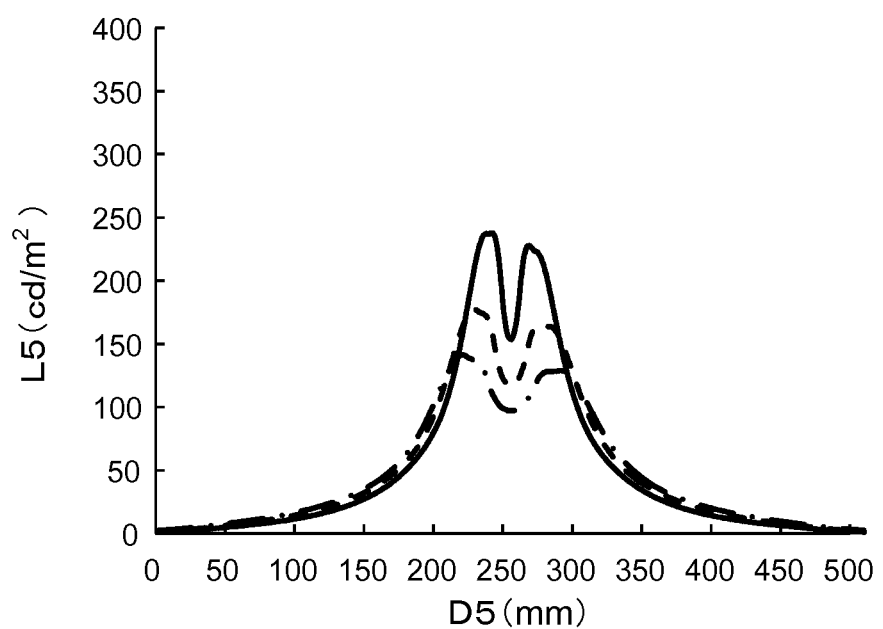
FIG. 10 is a graph illustrating the relationship between a measurement position and a luminous intensity in the surface light source device.

FIGS. 8A and 8B to 10 are graphs illustrating the relationship between the measurement position on diffusion plate 150 and the luminance on diffusion plate 150. FIG. 8A is a graph for light guide rod 142 on which light control parts 143 are disposed at ±60°. FIG. 8B is a graph for light guide rod 142 on which light control parts 143 are disposed at ±75°. FIG. 9A is a graph for light guide rod 142 on which light control parts 143 are disposed at ±90°. FIG. 9B is a graph for light guide rod 142 on which light control parts 143 are disposed at ±105°. FIG. 10 is a graph for light guide rod 142 on which light control parts 143 are disposed at ±120°. Further, in the measurement of luminance distribution, observation was made also for the cases of varying the distance from bottom plate 112 to diffusion plate 150. In FIGS. 8A and 8B to 10, a solid line is a curve for a surface light source device in which the interval between bottom plate 112 and diffusion plate 150 is 15 mm. A broken line is a curve for a surface light source device in which the interval between bottom plate 112 and diffusion plate 150 is 20 mm. A dashed line is a curve for a surface light source device in which the interval between bottom plate 112 and diffusion plate 150 is 25 mm. Further, measurement was carried out for the case where the size of the light emitting area (light emitting surface) of surface light source device 100 in the direction orthogonal to the axis of light guide rod 142 was also modified to 500 mm, and one light emitting device 140 was disposed at a position of 250 mm from the end part of diffusion plate 150.

The abscissas in FIGS. 8A and 8B, 9A and 9B, and 10 indicate measurement positions (D1 to D5; mm) on diffusion plate 150. Further, the ordinates indicate the luminous intensities (L1 to L5; cd/m$^2$) of the upper surface of diffusion plate 150. The parameters of the surface light source device used were set as follows: the number of light emitting device 140: 1, interval between reflection member 130 and light guide rod 142: 1 mm, diameter D of light guide rod 142: 8 mm, length of light guide rod 142: 69 cm, and measurement direction: direction orthogonal to the axis of light guide rod 142. It is noted that measurement was carried out at a position corresponding to 5 mm from the end part of diffusion plate 150.

As illustrated in FIGS. 8A and 8B, 9A and 9B and 10, in the surface light source device using light guide rod 142 having light control part 143 not within the range of 75° to 120°, the difference between the bright part (peak part) and the dark part (foot part) was relatively large. On the other hand, as illustrated in FIG. 9B, in the surface light source device using light guide rod 142 having light control part 143 within the range of 75° to 120°, it can be observed that the difference between the bright part (peak part) and the dark part (foot part) was small, and that the emitted light was expanded in the direction orthogonal to the axis of light guide rod 142. Further, in the surface light source device using light guide rod 142 on which light control part 143 is formed at 120°, it was observed that, while the intensity of the bright part is higher, the peak of the intensity of the bright part is divided into two portions, and thus the uniformity is easily obtained depending on the diffusion efficiency of diffusion plate 150, the distance from reflection member 130 to diffusion plate 150, or the like.

Figure 11A:
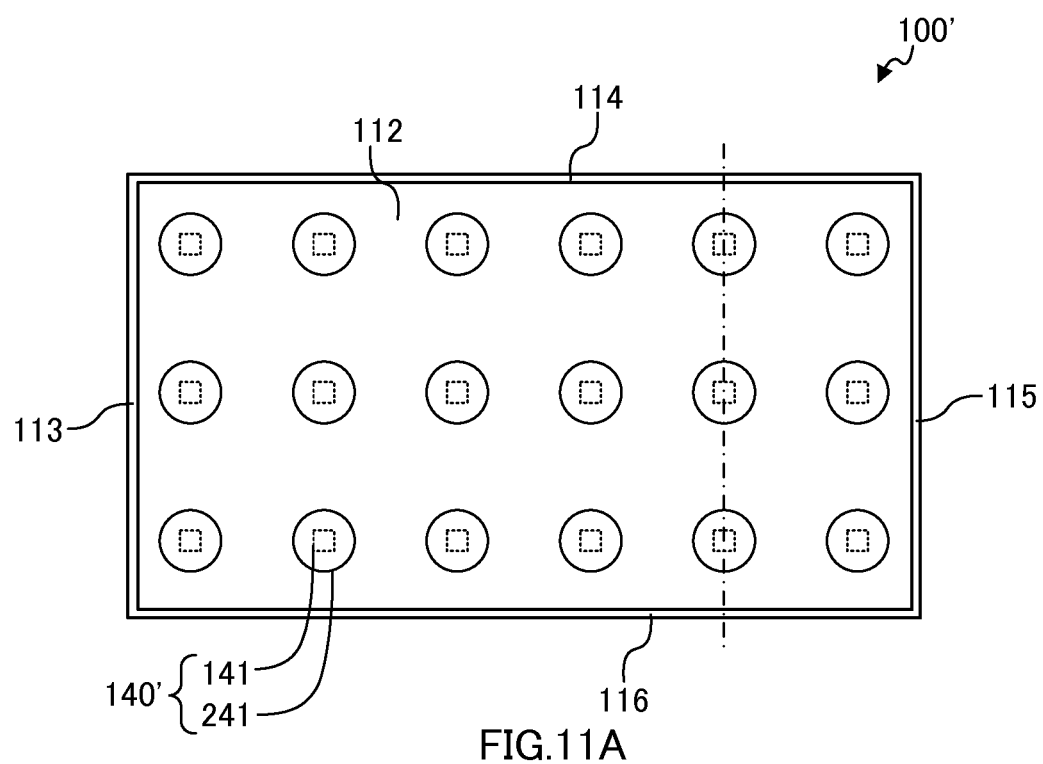
FIGS. 11A and 11B are drawings illustrating the configuration of a surface light source device and the measurement results of a luminance in the comparative example.
Figure 11B:
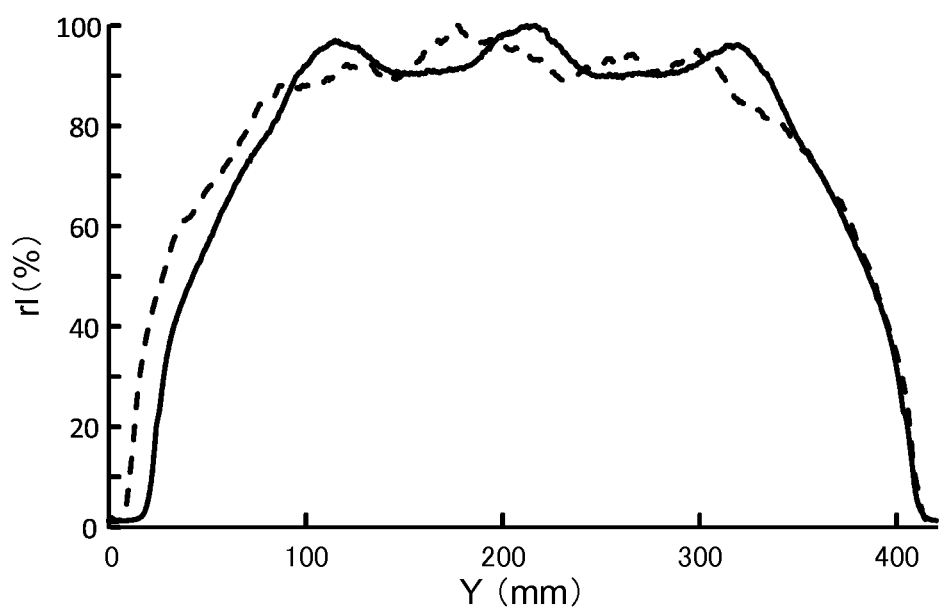

Next, measurement was carried out for the luminance distribution in surface light source device 100 on which a plurality of light guide rods 142 described above are disposed. It is noted that, for comparison, measurement was carried out also for a direct surface light source device in the same manner. FIG. 11A is a drawing illustrating the configuration of the surface light source device according to the comparative example, and FIG. 11B illustrates the measurement results of luminance distribution. The abscissa of FIG. 11B indicates the distance (y; mm) from the end part of diffusion plate 150, and the ordinate indicates relative luminance (rl; %). A solid line in FIG. 11B indicates the measurement results of the surface light source device according to the comparative example. Further, a broken line in FIG. 11B indicates the measurement results of the surface light source device according to the present invention (see FIG. 2).

The parameters of surface light source device 100 according to the present invention used were set as follows: the number of light emitting device 140: 9, interval between reflection member 130 and light guide rod 142: 1 mm, diameter D of light guide rod 142: 8 mm, length of light guide rod 142: 69 cm, interval between bottom plate 112 and diffusion plate 150: 15 mm, diffusion plate: first diffusion layer; two-layered luminance-enhancer film layer laminated on the first diffusion layer; and second diffusion layer laminated on the luminance-enhancer film layer, and measurement direction: direction orthogonal to the axis of light guide rod 142 (central portion of surface light source device). It is noted that measurement was carried out at a position corresponding to 5 mm from the end part of diffusion plate 150 (opening 117).

As illustrated in FIG. 11A, the light emitting device of surface light source device 100' of the comparative example used for measurement has a plurality of light emitting elements 141 disposed so as to emit light in the direction vertical to substrate 120, and a plurality of expansion lenses 241 disposed on the optical axes of light emitted from light emitting elements 141 and controlling the distribution of light emitted from light emitting elements 141. The measurement position of the intensity (luminance) of light in the case of using surface light source device 100' of the comparative example was set to be a part directly above light emitting device 140 (see broken line in FIG. 11B). Other parameters are the same as the parameters of surface light source device 100 according to the present invention.

As illustrated in FIG. 11B, in surface light source device 100' according to the comparative example having the expansion lens, there was unevenness in the intensity of light at the central portion. On the other hand, in surface light source device 100 according to the present invention using light guide rod 142, there was less unevenness in the intensity of emitted light on diffusion plate 150. Therefore, it can be observed that, in surface light source device 100 of the present invention, there is smaller luminance unevenness on the light emitting surface.

INDUSTRIAL APPLICABILITY

The surface light source device according to the present invention is useful, for example, for a back light of a liquid crystal display apparatus, or a surface illumination apparatus.

REFERENCE SIGNS LIST 100, 100' Surface light source device
110 Casing
111 Top plate
112 Bottom plate
113, 114, 115, 116 Side plate
117 Opening
120 Substrate
130 Reflection member
140, 140' Light emitting device
141 Light emitting element
142 Light guide rod
143 Light control part
150 Diffusion plate
241 Expansion lens

The invention claimed is:

1. A surface light source device comprising:
a light source;
a light guide rod that allows light emitted from the light source to enter through an end surface of the light guide rod and emits the incident light through an outer peripheral surface of the light guide rod; and
a diffusion plate that transmits light emitted from the light guide rod while diffusing the light, wherein:
the light guide rod includes at least one monolithic light control part that extends longitudinally in a belt-like manner on a part of a surface along a longitudinal axis of the light guide rod, and that carries out at least one of inwardly reflecting a part of light guided inside the light guide rod while scattering the part of the light, and outwardly emitting a part of light guided inside the light guide rod while scattering the part of the light,
in a cross section orthogonal to the axis of the light guide rod, an angle of light having peak intensity to be emitted from the light guide rod is 30° to 90° when an angle of a direction of a perpendicular relative to the diffusion plate from a center of the light guide rod is set as 0°, and
in the cross section, the at least one light control part is disposed on the surface of the light guide rod such that a center of the at least one light control part is disposed only at an angle of 75° to 120° in order that the angle of the light having peak intensity is 30° to 90° when an angle of a direction of a perpendicular relative to the diffusion plate from the center of the light guide rod is set as 0°.

2. The surface light source device according to claim 1, further comprising:
a reflection member that is disposed at a position facing the diffusion plate across the light guide rod, and reflects light emitted from the light guide rod toward the diffusion plate,
wherein an air layer is disposed between the light guide rod and the reflection member.

3. The surface light source device according to claim 1, wherein,
the at least one light control part comprises two light control parts, and
in the cross section, the two light control parts are disposed on the surface of the light guide rod at angle clockwise and counterclockwise respectively when an angle of a direction of a perpendicular relative to the diffusion plate from the center of the light guide rod is set as 0°.

* * * * *